United States Patent Office 2,870,168
Patented Jan. 20, 1959

2,870,168

DINAPHTHOFURANDIONE VAT DYESTUFFS

David I. Randall, New Vernon, and Wilhelm Schmidt-Nickels, Little York, N. J., assignors to General Aniline & Film Corporation, New York, N. Y., a corporation of Delaware No Drawing. Application December 30, 1955
Serial No. 556,414

6 Claims. (Cl. 260—346.2)

This invention relates to novel heterocyclic vat dyestuffs having the formula

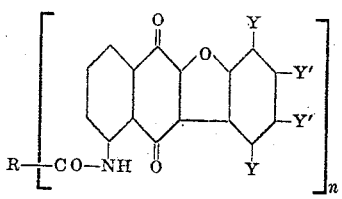

wherein one pair Y—Y' is hydrogen, the other pair Y—Y' is selected from the group consisting of

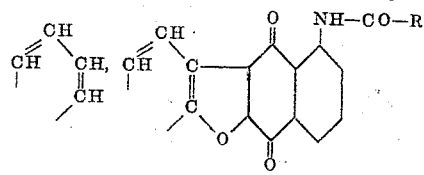

and

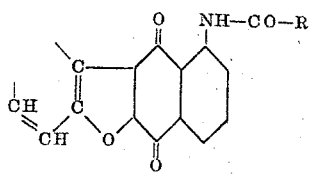

$n$ has a value of 1 or 2, and R is the aromatic radical bonded to the carbon atom of a carboxylic group of one of the aromatic carboxylic acids disclosed hereinafter as suitable acylating agents employed preferably in the form of their chlorides.

The provision of the above described compounds, and methods for their production constitutes the objects and purposes of the instant invention.

The compounds of the instant invention may be prepared by reacting an aromatic acylating agent, such as an aromatic carboxylic acid chloride of the formula R—[COCl]$_n$ wherein R is an aromatic radical as defined above, and $n$ is 1 or 2, with a dyestuff intermediate of the formula

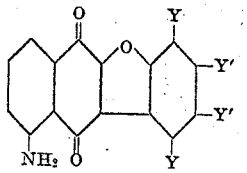

wherein one pair Y—Y' is hydrogen and the other pair Y—Y' is selected from the group consisting of

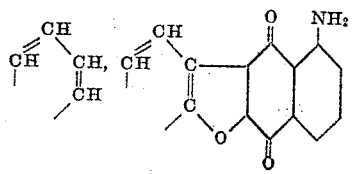

and

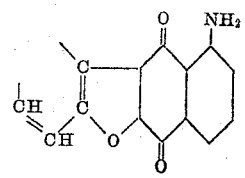

These dyestuff intermediates, and methods for their production are disclosed and claimed in our copending application Serial No. 556,395 filed on even date herewith.

As the aromatic acylating agent operative in the instant invention, there may be employed aromatic monocyclic, polycyclic, and heterocyclic monocarboxylic acid and polycarboxylic acid acylating agents. Such acylating agents are preferably employed in the form of their chlorides, although in the case of polycarboxylic acids, the anhydrides may be employed. By way of example, the following aromatic carboxylic acids may be employed, preferably in the form of their chlorides: benzoic, o- and p-chlorobenzoic, p-phenylbenzoic, cinnamic, phthalic, terephthalic acids, p,p'-diphenyldicarboxylic, naphthalene 1- and 2-carboxylic and 1,5- and 1,4-dicarboxylic, anthracene-2-carboxylic, anthraquinone-2-carboxylic, thiophene carboxylic, furane carboxylic acids, and the like.

The reaction is preferably carried out in the presence of an inert organic diluent such as an aromatic hydrocarbon or halogenated aromatic hydrocarbon. As representative of such diluents, there may be mentioned nitrobenzene, chlorobenzene, dichlorobenzene, trichlorobenzene, naphthalene, and the like. In the preferred embodiment, wherein the aromatic carboxylic acid is employed in the form of the chloride, an alkaline acid binding agent such as sodium carbonate, potassium carbonate or the like, may if desired be included in the reaction medium.

The temperature at which the reaction may be carried out will be dependent upon the reactants employed and the inert diluent in which the reaction is carried out. Generally, elevated temperatures are preferred., which for example may range from about 100 to 250° C. The optimum temperature in any particular instance will be readily ascertainable by the worker skilled in the art. It will be similarly apparent that the molar proportions of the reactants to be employed will depend upon the number of active carboxylic acid groups in the aromatic acylating agent and the number of free amino groups in the dyestuff intermediate.

The following examples, in which parts are by weight unless otherwise indicated, are illustrative of the instant invention and are not to be regarded as limitative. Unless otherwise indicated, parts by weight are in grams and parts by volume are in cc.

*Example 1*

A charge of 30 parts by volume nitrobenzene, 3.1 parts by weight of the compound of the structure:

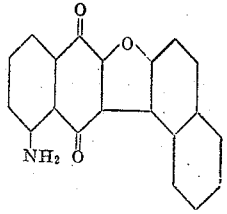

(Prepared as described in Example 2 of said copending application.)

and 1.0 parts by weight terephthaloyl chloride was stirred at 200–205° C. for 2½ hours. The reaction product was filtered off at room temperature, washed with nitrobenzene, acetone, water and dried. It has the formula:

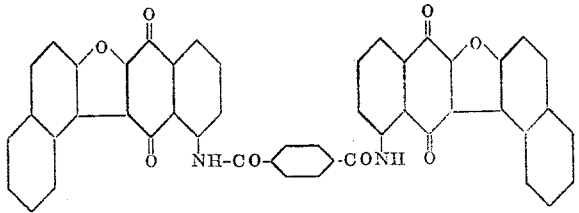

The product dyes cotton from an alkaline hydrosulfite vat bright orange shades of good fastness to washing, chlorine and light.

*Example 2*

A charge of 30 parts by volume nitrobenzene, 4.2 parts by weight of the compound of the structure:

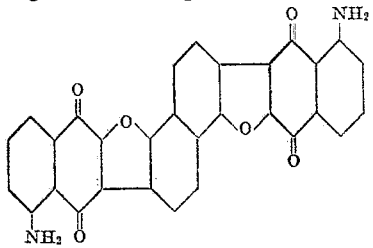

(Prepared as described in Example 3 of said copending application.)

and 2.1 parts by volume benzoyl chloride was stirred at 200–205° C. for 4 hours and worked up as described in Example 1. The reaction product has the formula:

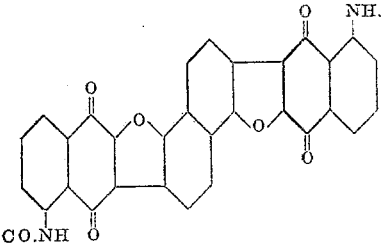

It dyes cotton from an alkaline hydrosulfite vat brown shades of good tinctorial strength.

The novel vat dyestuffs of this invention have good to excellent fastness properties to washing, chlorine and light.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. Compounds having the formula

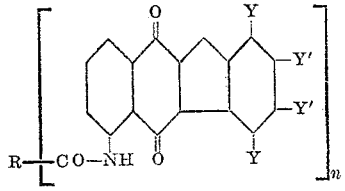

wherein one pair Y—Y' is hydrogen, the other pair Y—Y' is selected from the group consisting of

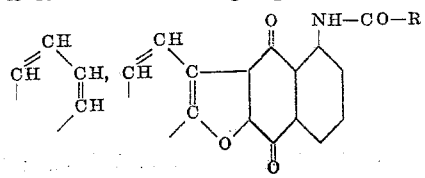

and

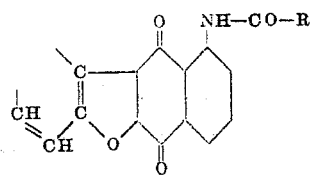

and R is the aromatic radical, bonded to the carbon atom of a carboxylic group, of an acid selected from the group consisting of benzoic, o- and p-chlorobenzoic, p-phenylbenzoic, cinnamic, phthalic, terephthalic acids, p,p'-diphenyldicarboxylic, naphthalene 1- and 2-carboxylic and 1,5- and 1,4-dicarboxylic, anthracene-2-carboxylic, anthraquinone-2-carboxylic, thiophene carboxylic, and furane carboxylic acids.

2. A compound having the formula

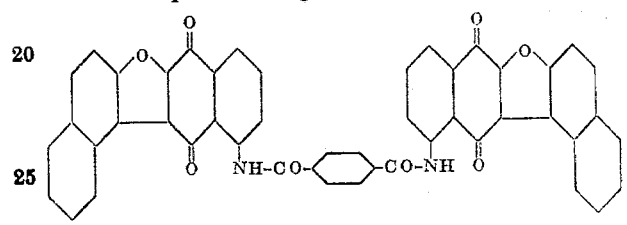

3. A compound having the formula

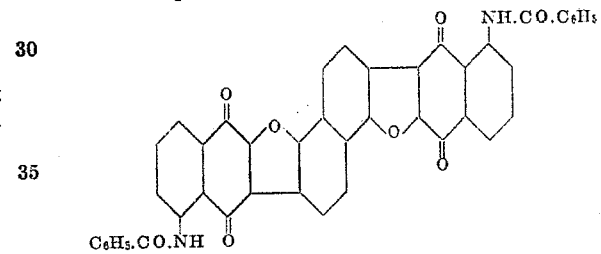

4. A process comprising reacting an acylating agent of the formula R—[COCl]$_n$, wherein $n$ has a value of 1 or 2 and R is the aromatic radical bonded to the carbon atom of a carboxylic group of an acid selected from the group consisting of benzoic, o- and p-chlorobenzoic, p-phenylbenzoic, cinnamic, phthalic, terephthalic acids, p,p'-diphenyldicarboxylic, naphthalene 1- and 2-carboxylic and 1,5- and 1,4-dicarboxylic, anthracene-2-carboxylic, anthraquinone-2-carboxylic, thiophene carboxylic, and furane carboxylic acids at elevated temperatures of about 100–250° C. with a compound having the formula

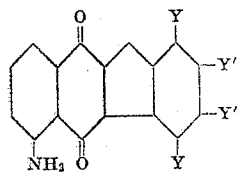

wherein one pair Y—Y' is hydrogen and the other pair Y—Y' is selected from the group consisting of

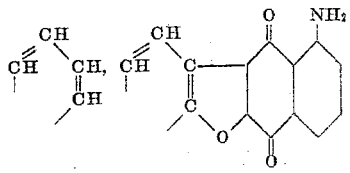

and

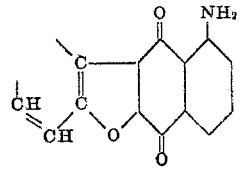

5. A process comprising reacting terephthaloyl chloride at elevated temperatures of about 100–250° C. with a compound having the formula
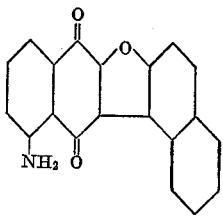
6. A process comprising reacting benzoyl chloride at elevated temperatures of about 100–250° C. with a compound having the formula
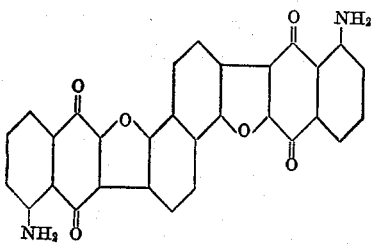
No references cited.